United States Patent
Goebel et al.

(10) Patent No.: US 6,672,158 B1
(45) Date of Patent: Jan. 6, 2004

(54) METHOD AND APPARATUS FOR BALANCING A VEHICLE WHEEL

(75) Inventors: Eickhart Goebel, Pfungstadt (DE); Bernhard Hoffmann, Wiesbaden (DE); Karl Rothamel, Ober-Ramstadt (DE); Walter Hollube, Pfungstadt (DE)

(73) Assignee: Hofmann Werkstatt-Technik GmbH, Pfungstadt (DE)

( * ) Notice: Subject to any disclaimer, the term of this patent is extended or adjusted under 35 U.S.C. 154(b) by 0 days.

(21) Appl. No.: 09/335,180

(22) Filed: Jun. 17, 1999

(30) Foreign Application Priority Data

Jun. 18, 1998 (DE) .......................................... 198 27 247

(51) Int. Cl.[7] .............................................. G01M 1/38
(52) U.S. Cl. ...................................................... 73/462
(58) Field of Search ........................ 73/462, 468, 487; 301/5.21, 5.22

(56) References Cited

U.S. PATENT DOCUMENTS

| | | | | |
|---|---|---|---|---|
| 4,576,044 A | * | 3/1986 | Boni ............................ | 73/462 |
| 5,189,912 A | | 3/1993 | Quinlan et al. ............... | 73/462 |
| 5,983,717 A | * | 11/1999 | Diez ............................ | 73/462 |
| 6,122,957 A | * | 9/2000 | Bux et al. .................... | 73/462 |

OTHER PUBLICATIONS

Derwent Abstract, Borner, et al, EP 358496 A, Mar. 1990.
Derwent Abstract, Bux, et al., DE 4432016 A, Mar. 1996.
*Geodyna 5000/5500*, Prospekt der Hofmann Werkstatt-Technik GmbH, Pfungstadt, Impressum 95 02 101, Mar. 1994, 8 pages.

* cited by examiner

Primary Examiner—John E. Chapman
(74) Attorney, Agent, or Firm—Shook, Hardy & Bacon, LLP

(57) ABSTRACT

In a method and an apparatus for balancing a motor vehicle wheel comprising a pneumatic tire and a disk wheel, the wheel is clamped on a measuring spindle and geometrical data of the wheel are sensed and stored. Wheel unbalance is ascertained in at least one measuring run and at least one balancing vector for balancing mass and balancing position is calculated in accordance with a balancing program selected in dependence on the disk wheel type and material, in at least one balancing plane. At least one balancing weight is fixed to the wheel in dependence on the balancing vector. When sensing a rim region of the wheel a sensor detects whether a rim portion extending substantially perpendicularly to the measuring spindle is or is not present in the rim region being sensed and the balancing program is selected in dependence on the signal obtained in the sensing operation with the sensor. A sensing apparatus includes a sensing member for sensing geometrical data of the wheel and a sensor for sensing a suitable rim configuration for applying a balancing weight thereto and/or the wheel material.

5 Claims, 3 Drawing Sheets

FIG.1 (Prior Art)
FIG.2
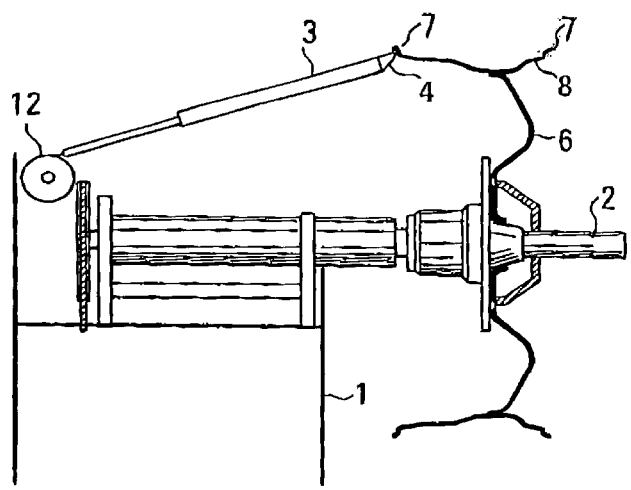
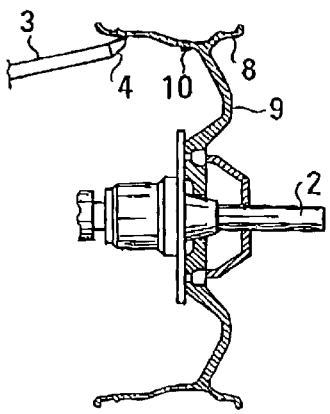
FIG.3  FIG.4  FIG.5
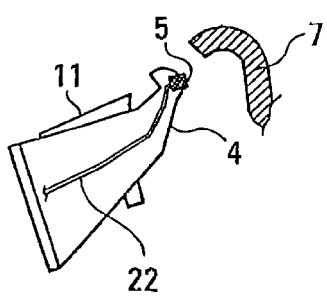
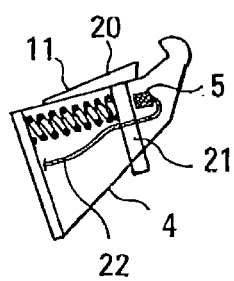
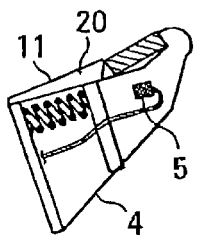
FIG.6
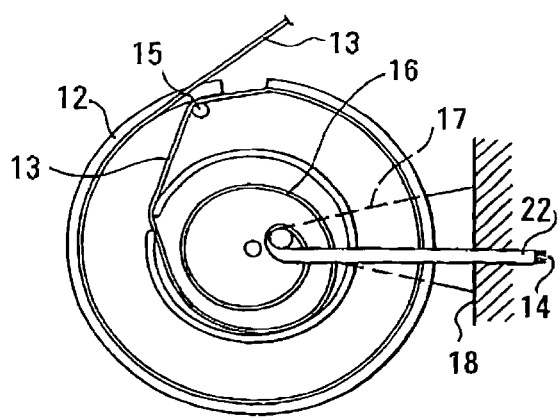

LEGEND: ⊟ CLIP-TYPE WEIGHT   ⊡ ADHESIVE WEIGHT

FIG. 9

| BALANCING MODE | SENSING LEFT | | | | | | SENSING RIGHT | | | |
|---|---|---|---|---|---|---|---|---|---|---|
| | WEIGHT WIDTH | MATERIAL | RIM FLANGE | SPACING 1 | SPACING 2 | DIAMETER | WEIGHT WIDTH | MATERIAL | RIM FLANGE | SPACING |
| NORMAL | | (X) | X | X | | X | | (X) | X | X |
| ALU 1 | (X) | (X) | | X | | X | | | | X |
| ALU 2 1ST SENSING / 2ND SENSING | (X) | (X) | | X | X | X / X | | | | |
| ALU 3 1ST SENSING / 2ND SENSING | (X) | (X) | X | X | X | X / X | | | | |
| ALU 4 | | (X) | X | X | | X | (X) | | | X |
| ALU 5 | (X) | (X) | | X | | X | | (X) | X | X |

METHOD AND APPARATUS FOR BALANCING A VEHICLE WHEEL

FIELD OF THE INVENTION

The invention concerns a method and apparatus for balancing a vehicle wheel such as a motor vehicle wheel, more especially comprising a pneumatic tire and a disk wheel on which the tire is fitted.

BACKGROUND OF THE INVENTION

In a method and an apparatus for balancing a motor vehicle wheel, as can be found in DE 42 29 865 C2 or DE 44 32 016 A1, the motor vehicle wheel is clamped on a measuring spindle of a balancing machine. The geometrical data of the wheel are mechanically sensed and stored and an unbalance is ascertained in at least one measuring run. The procedure involves calculating therefrom a balancing vector for the balancing mass and the balancing position in accordance with a balancing program which is selected in dependence on the disk wheel type and material, in at least one balancing plane on the motor vehicle wheel, and at least one balancing weight is fixed to the motor vehicle wheel in dependence on the balancing vector to compensate for the ascertained unbalance.

Conventional balancing machines, for example the Geodyna 5000 or Geodyna 5500 machines, see the prospectus from Hofmann Werkstatt-Technik GmbH, Pfungstadt Germany, imprint 950210103.94, have various balancing programs. The positioning of the balancing weights on the disk wheel can be determined by such balancing programs. Usually there is a standard program or normal program for disk wheels consisting of steel and five selectable balancing programs for disk wheels comprising light metal or alloy, in particular aluminum or aluminum alloy. That ensures that, depending on the type of disk wheel involved, the balancing weights are positioned on the wheel in consideration of the requirements for optimum smoothness of operation and visual appearance of the wheel, when carrying out the unbalance compensating operation.

SUMMARY OF THE INVENTION

An object of the invention is to provide a method of balancing a motor vehicle wheel in which the operating comfort and convenience when setting the machine to the type of wheel to be balanced is improved.

Another object of the invention is to provide a wheel balancing method which affords a combined procedure that brings together a number of operational aspects involved in balancing the wheel, in a reliable and readily implementable fashion.

Still another object of the invention is to provide an apparatus for balancing a motor vehicle wheel, which is of such a design as to facilitate the balancing operation and thus relieve operator stress.

Yet another object of the invention is to provide an apparatus for balancing a motor vehicle wheel, which permits the attainment of an enhanced degree of automation of operation.

In accordance with the invention, in regard to the method the foregoing and other objects are attained by a method of balancing a motor vehicle wheel comprising a pneumatic tire and a disk wheel, wherein the motor vehicle wheel is clamped on a measuring spindle of a balancing machine and the geometrical data of the wheel are sensed and stored. An unbalance of the vehicle wheel is ascertained in at least one measuring run and at least one balancing vector for the balancing mass and the balancing position is calculated in accordance with a balancing program selected in dependence on the disk wheel type and disk wheel material, in at least one balancing plane on the motor vehicle wheel. At least one balancing weight is fixed to the motor vehicle wheel in dependence on the balancing vector for compensation of the unbalance ascertained. When sensing the rim of the disk wheel, sensor means are used to detect whether a rim flange portion extending substantially perpendicularly to the measuring spindle is or is not present in the rim region being sensed; and in the rim-sensing operation detection of the material of the disk wheel is also effected, and a corresponding signal is produced. The balancing program is selected in dependence on the signals produced in the rim-sensing operation and the material-sensing operation.

In accordance with the invention in regard to the apparatus the foregoing and other objects are attained by apparatus for sensing a rim of a motor vehicle wheel which in operation of the apparatus is clamped on a measuring spindle of a balancing machine, comprising a sensing member which is mounted pivotably and extendably at the balancing machine and which has a sensing head. The sensing head carries a sensor responsive to a rim portion such as a rim flange which extends substantially perpendicularly to the axis of the measuring spindle.

Further in accordance with the invention and the apparatus aspect thereof the foregoing and other objects are attained by apparatus for balancing a motor vehicle wheel comprising a pneumatic tire and a disk wheel, including a measuring spindle for mounting the motor vehicle wheel, at least one sensing device for sensing geometrical data of the wheel, a storage means for storage of the geometrical data of the wheel, measuring means connected to the measuring spindle and operable in a measuring run to produce measuring signals are proportional to a wheel unbalance, an electronic machine system including an electronic evaluation arrangement and a plane computer and operable to calculate a balancing vector in dependence on the measurement values and the stored geometrical data of the wheel and a balancing program selected in dependence on the disk wheel type and disk wheel material, in at least one balancing plane on the wheel, wherein the sensing device includes at least one sensor by which a rim flange of the disk wheel can be detected and which is connected to the electronic evaluation arrangement, and wherein the electronic evaluation arrangement has a selection device operable to determine the balancing program in dependence on the sensed geometrical data of the wheel and the signal supplied by the sensor.

As will be seen in greater detail from the description hereinafter of preferred embodiments the invention provides that a rim of a disk wheel of a motor vehicle wheel is sensed by means of a preferably extendable sensing or feeler device. That involves ascertaining geometrical data such as radius or diameter and spacing of the rim in relation to the measuring shaft or spindle and measurement units which are influenced by the measuring spindle and which are connected to the electronic evaluation arrangement. Signals corresponding to the geometrical data ascertained in that way are passed to the electronic evaluation arrangement and possibly stored.

When mechanically sensing a rim region of the wheel, the axial spacing of which from the frame of the machine or the measurement units approximately corresponds to the axial spacing of a balancing plane, the procedure involves detecting by sensor means, for example by means of a sensor associated with the respective mechanical sensing or feeler device, whether a rim portion which extends at least substantially perpendicularly to the measuring spindle, in particular one of the two rim flanges, is or is not present in the rim region which is being sensed. In dependence on the signal obtained by the sensor means in that sensing operation, and the geometrical data ascertained in the mechanical sensing procedure, the balancing program is then selected or at least some of the programs which can be considered for the unbalance compensating operation are selected from the plurality of available balancing programs.

If the material of the disk wheel cannot be readily established, for example by visual inspection, then the mechanical sensing operation further involves detecting and recognising the material of the disk wheel and producing a corresponding signal, as is described in U.S. Pat. No. 5,983,717 (application Ser. No. 08/996,393), to which reference is accordingly directed for incorporation thereof. In dependence thereon and the result obtained in the rim region sensing operation, a further selection is then made in respect of the balancing programs available for compensating for unbalance, and the appropriate balancing program is selected. The electronic evaluation arrangement is then set to the appropriate type of wheel. In addition in that case also the choice of balancing program is dependent on the distance or the spacing of the sensed region or the balancing plane from the frame of the machine or from the measurement units or a representative reference plane which extends perpendicularly to the axis of the measuring spindle.

For the purposes of producing the signals by sensor means, a sensor can be arranged in the sensing or feeler head of a respective mechanical sensing member, for example a sensing bar of a sensing device. That makes it possible to detect whether the sensing head is disposed in a rim region in which there is a suitable rim portion, in particular a rim flange, that extends substantially perpendicular to the axis of the measuring spindle. That makes it possible to detect whether the sensing head is or is not bearing against the rim flange in the sensing operation. If the sensing head is disposed in the region of the base of the rim flange which extends approximately parallel to the wheel axis or further inwardly in the concealed inner region of the inward side of the rim (rim bed or bowl) in the sensing operation, the sensor does not detect a rim portion which extends perpendicularly to the measuring spindle. For example in the first case in which the rim flange is detected by the sensor, a corresponding signal at a given level can be outputted. If the rim flange is not detected by the sensor, the sensor can output a zero signal, no signal or a signal at another level.

Besides the conventional steel and light metal or alloy rims, also available on the market are disk wheels comprising light metal or alloy plate, in particular consisting of aluminum. The visual appearance of those disk wheels comprising light metal or alloy and in particular aluminum plate is substantially the same as the visual appearance of disk wheels consisting of steel plate. Particularly if the light metal or alloy and in particular aluminum plate disk wheels are painted with the same usual colour, which is generally black, as disk wheels of steel plate, major difficulties are often involved in ascertaining the correct material of the disk wheel and the correct choice of balancing weights, just on the basis of visual judgment. When fitting weights to one or both rim flanges of disk wheels of light metal or alloy plate, it is necessary to use special weights, for example clip-type weights, which do not damage the rim at the rim flange when they are fitted. Furthermore to avoid corrosion it is necessary for the weights to have a coating of suitable plastic material or of the same material as the light metal or alloy plate rim.

Preferably therefore the sensor is of such a nature that it can also detect the material of the disk wheel and in particular the rim thereof. In that respect, the sensor, as is described in above-mentioned U.S. Pat. No. 5,983,717 (application Ser. No. 08/996,393) distinguishes whether the disk wheel or the rim comprises a non-ferromagnetic material, for example aluminum, magnesium or titanium or alloys or mixed alloys thereof, or whether it comprises a ferromagnetic material, in particular steel. For that purpose the sensor can be in the form of an inductive proximity sensor whose magnetic field lines preferably issue approximately parallel or at an acute angle relative to the axis of the measuring spindle. The magnetic field lines are not only influenced when the sensor approaches a rim portion extending substantially perpendicularly to the measuring spindle, in particular a rim flange, but also they are influenced by the rim material. The sensor which is preferably in the form of an inductive proximity initiator or switch can be connected to an oscillator circuit whose oscillations, in particular frequency, are varied in dependence on the influencing of the magnetic field lines. It is further possible in that way to detect whether the rim material is a light metal or alloy or a ferromagnetic material, in particular steel. A particularly suitable sensor is a sensor which is responsive to ferromagnetic material and which can be of such a design that it responds only to ferromagnetic material. It is possible for that purpose to use the above-mentioned inductive proximity switch or initiator (see for example 'Elektrotechnik' 57, issue 24, Dec. 7, 1975, pages 39–42). Further suitable sensors are capacitive proximity switch, optical reflection switches, microswitches and the like.

In addition the sensing head in accordance with the invention can be of such a configuration that the dimension and in particular width of a balancing weight which is fitted into the sensing device is determined by sensor feeler sensing, for example by means of a separate sensor or by means of the sensor which provides for sensing the rim flange and/or the material involved. For that purpose the sensing head has a weight-holding device as is to be found in DE 41 43 623 to which reference is made to incorporate the disclosure thereof. By virtue of that sensing procedure, it is possible to detect whether the holding device is in the rest position or whether a weight and more particularly an adhesive weight is fitted into the sensing head or the holding device. In that way it is possible to achieve an improvement in the degree of accuracy involved in positioning the weight in the balancing operation. In particular it is possible in that respect to take account of the position of the center of gravity of the balancing weight (see DE 27 37 524 A1). It is also possible to detect from the signal outputted by the sensor whether an adhesive weight is fitted in the holding device and/or what the width of the weight is. Those signals can also be used for determining the balancing program and thus for setting the electronic evaluation arrangement to the appropriate type of wheel. For that purpose the sensor can be in the form of a travel measuring device which determines the position of the weight-holding device, in particular a spring-loaded holding portion of the weight-holding device (see DE 42 29 865 C2).

The electric lines with which the sensor signals are passed to the electronic evaluation arrangement can be secured by way of a flexible pull or traction element, for example a band or toothed belt, which serves to determine the extension length of the sensing member, as in EP 0 694 775 A2 to which reference is directed. That flexible pull element is connected to the sensing head and can be passed by the telescopically extendable sensing member such as for example a sensing bar to a roller which is acted upon by a drive spring to hold the pull element and in particular the toothed belt taut. The flexible pull element can also be used in known manner for limiting extension of the sensing head provided with the weight-holding device, as for example when a balancing position is reached in the balancing procedure. It is possible for that purpose to use a blocking device such as for example a clamping device as is known for example from EP 0 694 775 A2.

For feeding the operating voltage to the sensor and for the signal lines, it is also possible to employ a flexible circuit board which is passed along the flexible pull element.

Further objects, features and advantages of the invention will be apparent from the following description of preferred embodiments.

BRIEF DESCRIPTION OF THE DRAWINGS

FIG. 1 diagrammatically shows the arrangement of a disk wheel of light metal or steel plate of a motor vehicle wheel, on a balancing machine, FIG. 2 shows a cast disk wheel of light metal which is clamped on the measuring spindle of the balancing machine, FIG. 3 shows a sensing head with a sensor in the region of a rim flange, FIG. 4 shows a sensing head with a sensor for monitoring the weight-holding device in the sensing head, FIG. 5 shows the arrangement illustrated in FIG. 4 with inserted adhesive weight.

FIG. 6 shows an embodiment of sensor lines with which sensor signals are passed to the electronic evaluation arrangement.

FIG. 9 shows a selection matrix in accordance with which the balancing program is selected in dependence on signals produced in the wheel-sensing operation.

DESCRIPTION OF PREFERRED EMBODIMENTS

Figure 7:
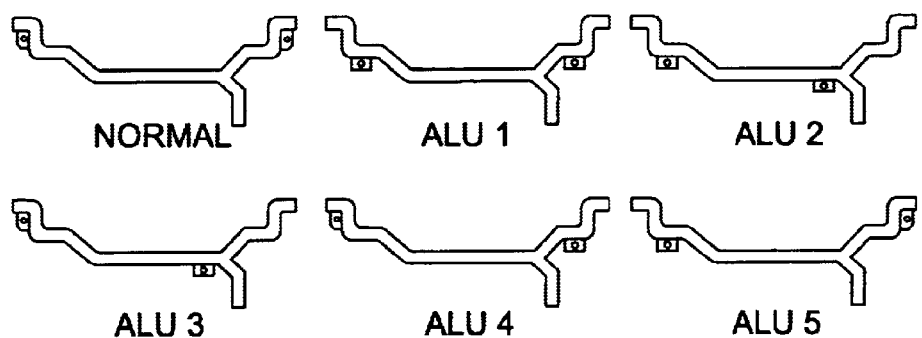
FIG. 7 shows various balancing programs for weight positioning purposes for compensating for unbalance on a motor vehicle wheel.

Referring to FIG. 1, shown therein is a conventional balancing machine with a machine frame 1. A measuring spindle 2 is notably supported on the machine frame 1 in known manner. Measuring units which are not shown in detail such as force transducer units are influenced during the measuring run by the measuring spindle 2, as a result of forces caused to act on the measuring spindle 2 by unbalance of the vehicle wheel. The measurement signals which the measuring transducer units output are evaluated in known manner by an electronic evaluation arrangement and converted into balancing vectors in given balancing planes of the vehicle wheel.

A motor vehicle wheel to be tested, comprising a disk wheel 6 and a pneumatic tire, is clamped on the measuring spindle 2 in known manner. In FIG. 1 the disk wheel 6 comprises steel or light metal or alloy plate, in particular aluminum plate. The embodiment shown in FIG. 2 involves a disk wheel of cast light metal or alloy, more particularly for example aluminum, magnesium, titanium or an alloy or mixed alloy thereof.

Geometrical data of the disk wheel 6 (FIG. 1) or 9 (FIG. 2) in relation to the measuring spindle 2 and the measuring units which are influenced by the measuring spindle as a result of wheel unbalance can be ascertained by means of an extendable sensing device which has a mechanical sensing member 3 in the form of a telescopic sensing bar. For that purpose, a sensing head 4 shown in FIGS. 3 through 5 provided at the front end of the sensing member 3 is caused to bear against given regions of the rim. When that is done, the rim radius or diameter and the spacing of the respective rim region from the machine or the measuring units such as transducers which are influenced by the measuring spindle 2 in the measuring run are determined in dependence on the extension length of the sensing member 3 and its angle of pivotal movement. A proportional signal can be produced in regard to the pivotal angle of the sensing member 3 in a rotary potentiometer (not shown).

For this purpose the sensing member 3 can be connected to a roller 12 by way of a flexible pull or traction element 13 which can be in the form of a toothed belt, band, cable or other flexible element. The roller 12 is acted upon by a drive spring so that the pull element 13 is kept constantly in a taut condition as in FIG. 6. A signal corresponding to the extension length of the sensing member can be produced by means of a rotary potentiometer (not shown) which is connected to the roller 12, in which respect attention is directed to EP 0 694 775 A2 which is thereby incorporation herein.

As can be seen more particularly from FIGS. 3 through 5, a sensor 5 is disposed in the sensing head 4. During the operation of sensing the various rim regions with the sensing head 4, it is possible to detect by means of the sensor 5 whether a rim portion which extends substantially perpendicularly to the measuring spindle 2 is or is not present in the rim region which is being sensed by the sensing head 4. In particular it is possible to detect whether a rim flange 7 is or is not present at the region being sensed, more especially in front of the sensing head 4. In this respect the sensing operation using the sensing head 4 can involve the inner rim flange 7 as shown in FIG. 1 and in FIG. 3 or the outer rim flange which is also identified by reference 7 in for example FIG. 1, adjacent the rim bed portion 8. A sensing device as is described for example in EP 0 642 007 A2 is suitable for sensing the outer rim flange 7. It is thus possible to implement sensing of the inner rim regions (sensing at the left in the matrix shown in FIG. 9) and sensing of the outer rim regions (sensing at the right in the matrix shown in FIG. 9). A respective separate sensing member 3 with the respectively associated sensor 5 can be provided for sensing at the left and for sensing at the right.

The respective sensor 5 can be so designed that it is possible to implement material detection therewith. It is possible for example with the sensor 5 to detect whether the rim material is a ferromagnetic material, more especially steel, or a non-ferromagnetic material, for example aluminum, aluminum alloy or another light metal or alloy, in which respect reference is again directed to U.S. Pat. No. 5,983,717 (application Ser. No. 08/996,393). An additional sensor can also be provided for sensing the material.

Figure 8:
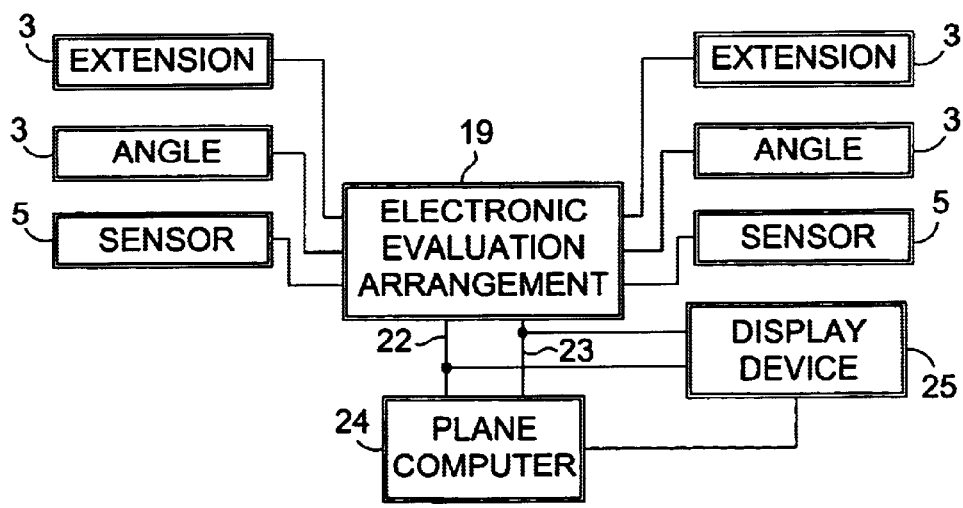
FIG. 8 shows a block circuit diagram to illustrate program selection in dependence on the sensor signals.

If the situation involves a plate rim with rim flanges 7 for fitting clip-type weights (FIG. 7), sensing by the sensing device 3, 4 is effected in the region of the rim flanges 7 as shown in FIG. 3. In that case, the sensor 5 detects that such sensing of the rim is effected at the respective rim flange. By virtue of sensing of the material involved, this procedure also affords further information about the plate material of which the disk wheel or the rim is made. The sensor 5 can distinguish whether the disk wheel is formed from aluminum or another light metal, for example light metal alloy, or steel. As can be seen from FIG. 8, the sensor 5 outputs corresponding signals which are processed in an electronic evaluation arrangement 19. The signals for the geometrical wheel data, which correspond to the extension length (extension) and the pivotal angle (angle) of the respective sensing member 3 (left, right) are also inputted into the electronic evaluation arrangement 19. The electronic evaluation arrangement 19 includes a selection device in the form of selection logic (selection matrix), as is shown in FIG. 9. In accordance with that selection matrix the appropriate balancing program is selected in dependence on the signals obtained in the sensing procedure. If the disk wheel comprises aluminum or another non-ferromagnetic light metal or alloy, the electronic evaluation arrangement 19 selects balancing programs for light metal or alloy rims, more specifically Alu 2 to Alu 5. For the situation where the sensor 5 further detects that sensing is being effected at the rim flange 7, the electronic evaluation arrangement 19 implements a further selection in respect of the balancing programs for light metal or alloy rims Alu 3, Alu 4 and Alu 5 (FIG. 7, matrix in FIG. 9). In the case of the programs Alu 3 and Alu 4 sensing is effected at the inner rim flange 7 while in the case of Alu 5 sensing is effected at the outer rim flange.

In the situation where the rim flange 7 is not detected by the sensor 5, the electronic evaluation arrangement 19 receives signals which specify that the sensing head 4 is in a rim region in the rim flange base or in an inwardly disposed, concealed rim region. In dependence on the extension length (extension) of the sensing member 3 which is proportional to the spacing of the sensing head 4 relative to the measurement units or a reference plane of the machine and the pivotal angle (angle) of the sensing member 3 which is proportional to the radius or diameter, the corresponding balancing plane can then be recognised on the basis of the rim regions which are being sensed by the sensing head 4. There is then no longer any need for the operator to input that balancing program into the electronic evaluation arrangement or the electronic system of the machine. The electronic evaluation or machine system then calculates from the measurement values obtained during the measurement run and from the geometrical data which were inputted with the sensing device and the selected balancing program, the balancing vectors (mass and angular position) in the appropriate balancing planes of the rim. If the material of the rim or the disk wheel is known to the operator or if the operator can readily ascertain those factors, the signals which concern the material and the width of the weight and which are shown in parentheses in the selection matrix in FIG. 9 are not required.

The balancing programs shown in FIG. 7 are common balancing programs which can be carried out on a balancing machine. The balancing program which is identified by 'normal' is used in relation to disk wheels comprising steel plate or light metal or alloy plate, with clip-type weights being fitted to the inner and outer rim flanges. Special clip-type weights are used in the case of disk wheels of light metal or alloy plate. By virtue of the material sensing operation which has already been described hereinbefore, it is possible to distinguish between disk wheels of light metal or alloy plate, and steel plate. It can be seen from FIG. 9 that suitable signals are available for selecting that balancing program when sensing the rim, for both rim flanges. The electronic evaluation arrangement 19 is also supplied with sensing signals proportional to the respective spacings from the machine and the radius or diameter of the rim at the two balancing locations. The signals in respect of the spacings and the respective diameters involved are proportional to the extension lengths and pivotal angles (angle) of the sensing member 3. That also applies in regard to the signals which are obtained when sensing the other rim regions, for respective selection of the balancing program in the electronic evaluation arrangement 19.

The balancing programs Alu 1 and Alu 2 are in relation to those disk wheels in relation to which exclusively adhesive weights are employed. The adhesive weights are arranged either at both rim flange bases (Alu 1) or at the inner rim flange base and in a rim region (Alu 2) which is disposed at the inside in a concealed position. The balancing programs Alu 1 and Alu 2 are preferably used in relation to cast disk wheels of light metal or alloy, in regard to which the rim flanges are not suitable for fitting clip-type weights or the use of adhesive weights is desired for visual reasons.

For selection of the balancing program Alu 1, both in regard to sensing on the left, that is to say at the inside of the rim, and also in regard to sensing on the right, that is to say when sensing at the outside of the rim, sensing is effected at the respective rim flange base. In accordance with the respective spacings and the diameter at the balancing locations, the electronic evaluation arrangement 19 receives the signals which are identified in the matrix shown in FIG. 9 and which are sufficient for determining the balancing program Alu 1.

For selection of the balancing program Alu 2 sensing operations are implemented at the inside of the rim (sensing on the left). For that purpose, the spacings or extension lengths of the sensing member 3 are determined at the inner rim flange base (first sensing step) and at the rim region which is at an inner concealed position (second sensing step), as well as the pivotal angles (angle) associated therewith, and evaluated for selection of the balancing program Alu 2. No sensing operation is effected at the outside of the wheel (sensing at the right).

Balancing programs Alu 3 to Alu 5 can be used in relation to disk wheels of light metal or alloy plate, in which case the respective clip-type weight to be fitted to the rim flange is a special clip-type weight which is suitable for that purpose, for example with a protective coating thereon. In the case of the balancing programs Alu 3 and Alu 4 those clip-type weights are fitted in the inner rim flange while in the case of the balancing program Alu 5 they are fitted at the outer rim flange. In the case of the balancing program Alu 3 the second balancing weight is fixed in the form of an adhesive weight in an inwardly disposed, concealed plane at the inside of the rim. In the case of the balancing program Alu 4 the second balancing weight is fixed in the form of an adhesive weight at the outwardly disposed rim flange base. In the case of the balancing program Alu 5 the second balancing weight is fixed in the form of an adhesive weight at the inner rim flange base.

Selection of the program Alu 3 by the evaluation arrangement 19 is effected on the basis of a rim flange signal when implementing sensing at the left, that is to say at the inward side of the rim, with the spacing associated therewith and the pivotal angle associated therewith. This is the first sensing step at the inward side of the rim (sensing at the left). A second sensing step follows at the inward side of the rim in the rim region which is disposed inwardly at a concealed position, with the corresponding values in respect of spacing and diameter. No sensing procedure is effected at the outward side of the wheel (sensing at the right).

Selection of the balancing program Alu 4 is effected on the basis of the rim flange signal with associated spacing and diameter for the inward side of the wheel (sensing on the left) and the spacing signal which characterises sensing (sensing on the right) at the outer rim flange base and which can possibly also be supplemented by a signal in respect of weight width.

The balancing program Alu 5 is selected by the electronic evaluation arrangement 19 on the basis of the spacing signal (extension length) which is associated with the inner rim flange base, with the associated diameter signal that is proportional to the pivotal angle of the sensing member 3, and also on the basis of the existence of a signal which gives the presence of the rim flange at the outward side of the wheel, with associated spacing.

In accordance with those balancing programs the associated rim regions are sensed in the described manner and the electronic evaluation arrangement 19 selects the associated balancing program. The wheel data are passed to a plane computer 24 by way of a line 22. The plane computer 24 ascertains in known manner in dependence on the measurement values which are obtained during a measuring run and which are proportional to the unbalance, and the wheel data (geometrical data), the balancing masses which are to be fitted to the balancing locations. The computer 24 can possibly also receive the respective balancing program selected by the electronic evaluation arrangement 19. Both the geometrical wheel data and also the balancing program are preferably displayed by means of a display device 25. The display device 25 also includes display fields or panels for displaying the size of the balancing weights or masses and the angular positions at which the balancing weights or masses are to be mounted at the balancing planes determined by the balancing program.

As FIGS. 4 and 5 show the sensor 5 can be arranged in the sensing head 4 in such a way that by travel measurement it establishes whether an adhesive weight or a clip-type weight or no weight is disposed in a weight-holding device 11 on the sensing head 4. For that purpose, a sensing leg 21 of ferromagnetic material can be secured to a clamping jaw 20 of the weight-holding device. The sensing bar leg is sensed by the sensor 5 in regard to its distance from the sensor 5. An additional sensor can also be provided for sensing the weight-holding device 11. It is possible in that way for the width of the weight fitted into the weight-holding device 11 to be sensed. That gives an indication as to whether a clip-type weight or an adhesive weight is fitted therein. Clip-type weights are intended for fixing to the respective rim flange 7 and adhesive weights are intended for fixing to the inner rim surface which is towards the measuring spindle 2, for example in the region of the rim flange base or at an inwardly disposed, concealed balancing location.

An inductive proximity switch is particularly suitable for the sensor 5 or the additional travel-measuring sensor. It is mounted to the sensing head 4 in such a way that its magnetic field lines issue substantially horizontally. That makes it possible to detect whether the sensing head 4 is bearing against the rim flange 7 or is in the region of a rim flange base or further inwardly, within the rim, at a concealed rim region. In this respect the inductive proximity switch can be of such a configuration that oscillations of its oscillator are maintained even in the occupied (damped) condition. The frequency of the oscillator is evaluated so that a reduction or a rise in the frequency in the damped condition relative to the undamped condition can be detected. The frequency rises when it approaches a non-ferrous metal. The frequency falls when it approaches a ferrous metal, for example steel. That makes it possible to detect the material of the rim. In the case of a rim of steel plate the electronic evaluation arrangement 19 accordingly outputs a signal (3) which moreover possibly selects the balancing program 'normal' in dependence on the extension length of the sensing device or the balancing weight fitted in the holding device 11. The electronic evaluation or machine system is set accordingly.

An arrangement as shown in FIG. 6 is provided in order to pass signals which are outputted by the sensor and the sensing device, to the electronic machine system. The sensing member 3 of the sensing device is connected to a flexible pull or traction element 13, for example a toothed belt. It is wound on to a belt roller 12 which is acted upon by a drive spring. The pull element 13 is held constantly taut by the drive spring. The position of the belt roller 12 is sensed in dependence on the extension length of the sensing member 3, for example by a rotary potentiometer, and a corresponding signal is supplied to the electronic evaluation or machine system. A signal corresponding to the pivotal angle of the sensing member 3 is also passed to the electronic evaluation or machine system.

Signal lines 22 are provided for transmitting the operating voltage and the output signals for the sensor 5. The signal lines 22 are passed along the flexible pull element 13 or within same. For that purpose, a flexible circuit board can be passed parallel to the pull element 13 and possibly secured thereto. The pull element 13 and the flexible circuit board are fixed by way of a clamping point 15 to the belt roller 12 and prolonged therebeyond to form a loop 16. The loop 16 is secured at the other end to a holder 17. The belt roller 12 is also mounted to that holder 17. The rotary movement of the belt roller 12 is compensated by the loop 16. The signal lines 22 are taken to an electrical connecting location 14 at a stationary part of the machine 18. The connecting location 14 provides for connection to the electronic evaluation or machine system 19 which passes the corresponding signals for selection of the appropriate balancing program.

It will be appreciated that the above-described methods and apparatus structures have been set forth solely by way of example and illustration of the present invention and that various other modifications and alterations may be therein without thereby departing from the spirit and scope of the present invention.

What is claimed is:

1. A method of balancing a motor vehicle wheel comprising a pneumatic tire and disk wheel, wherein the motor vehicle wheel is mounted on a measuring spindle of a balancing machine, geometrical data of the wheel are sensed and stored, when sensing the rim of the disk wheel sensor means are used to detect whether a nm flange is present, in the rim-sensing operation detection of the material of the disk wheel is also effected and a corresponding signal is produced, a balancing program is selected in dependence on the signals produced in the rim-sensing operation and the material-sensing operation, at least one measuring run is effected to ascertain wheel unbalance, at least one balancing vector for the balancing mass and the balancing position is calculated in accordance with the balancing program selected in dependence on the disk wheel type and disk wheel material, in at least one balancing plane on the disk wheel, and at least one balancing weight is fixed to the disk wheel in dependence on the balancing vector for compensation of the unbalance ascertained, wherein in addition the dimension of a balancing weight fitted into the sensing device is determined by sensing means of a sensor.

2. A method as set forth in claim 1
wherein the selection of the balancing program is also effected in dependence on the distance of the balancing planes which are sensed at the rim from a machine structure.

3. A method as set forth in claim 1
wherein said dimension of a balancing weight is the width thereof.

4. Apparatus for sensing a rim of a motor vehicle wheel comprising a disk wheel and a pneumatic tire, when clamped on a measuring spindle of a balancing machine, including a sensing member which is mounted pivotably and extendably at the balancing machine and which includes a sensing head, and a sensor arranged at the sensing head and responsive to a rim portion which extends substantially perpendicularly to the axis of the measuring spindle, wherein the sensing device includes a weight-holding means, and the sensor is also operable to detect the position of the weight-holding device.

5. Apparatus as set forth in claim 4
wherein the sensor is operable to produce at least three different signals of which a signal is dependent on the rim material.

\* \* \* \* \*